United States Patent

Asbrand et al.

[11] Patent Number: 5,868,161
[45] Date of Patent: Feb. 9, 1999

[54] DAMPER VALVE

[75] Inventors: Ulrich Asbrand, Remshalden; Aydogan Cakmaz, Stuttgart; Juergen Class, Illingen, all of Germany

[73] Assignee: Daimler-Benz AG, Stuttgart, Germany

[21] Appl. No.: 950,959

[22] Filed: Oct. 15, 1997

[30] Foreign Application Priority Data

Oct. 17, 1996 [DE] Germany ............. 196 42 837.8

[51] Int. Cl.$^6$ .................................. F16K 31/12
[52] U.S. Cl. .................. 137/498; 137/504; 137/517; 91/443
[58] Field of Search ................... 137/498, 504, 137/517, 614.2; 91/432, 443, 449, 450, 452, 462

[56] References Cited

FOREIGN PATENT DOCUMENTS 43 23 179  11/1994  Germany.

Primary Examiner—John E. Ryznic
Attorney, Agent, or Firm—Klaus J. Bach

[57] ABSTRACT

In a damper valve for use in a steering damper arrangement of a motor vehicle having a hydrostatic displacement motor for operating the vehicle steering mechanism wherein hydraulic fluid lines extending between the hydraulic motor and a servo-valve include the damper valve, the damper valve has a throttling arrangement which permits fluid flow in one direction and limits fluid flow in the opposite direction but permits essentially unlimited fluid flow in both directions as long as the pressure difference across the damper valve is below a predetermined threshold value so as to permit unrestricted normal steering movements of the vehicle steering system, but dampen shock movements thereof.

4 Claims, 4 Drawing Sheets

DAMPER VALVE

BACKGROUND OF THE INVENTION

The invention relates to a damper valve, particularly for an external steering damper or a hydraulic power steering of a motor vehicle, which includes a hydraulic positive displacement motor. The hydraulic positive displacement motor serves also as a steering damper by providing in the hydraulic connecting lines or passages extending between the motor and the servo-valve damper valves with throttling structures permitting fluid flow in at least one direction and including check valves which are arranged in parallel with the damper valves and are open in the opposite direction and have no or little throttling effect for fluid flows when they are in their open positions.

Such damper valves or rather power steerings which include such damper valves are known from DE 43 23 179 C1. The known damper valves include a valve support member in the form of a perforated plates, which have passages and which are either provided with resilient valve discs or a spring loaded valve plate by which hydraulic fluid flow through the passages can be controlled. The resilient valve discs on the front side of the perforated plate as well as the spring-loaded valve plate at the opposite side of the perforated disc are supported on the valve support member by bolts. The openings controlled in this arrangement by the resilient valve discs form throttling passages through which fluid can flow in one direction, whereas the openings controlled by the spring loaded valve plate serve as check valve structures which are open or only slightly throttling in the direction opposite to the one direction.

For a power steering with a double-acting piston cylinder unit each side of the unit is in communication with a motor connection of a servo valve so that a controllable pressure difference can be established between the two sides in one or the opposite direction. To insure the steering damper function, the connecting lines between the two sides of the piston-cylinder unit and the servo valve include the previously described damper valves in such an arrangement that their check valves open for a fluid flow into the piston cylinder unit.

External steering dampers are typically double acting piston cylinder units whose cylinder chambers are in communication with one another by way of throttling means in such a way that, upon movement of the piston, hydraulic fluid flows from one cylinder chamber to the other by overcoming a throttling resistance. Damper valves of the type as originally described can also be utilized with such steering dampers wherein in both piston stroke direction two damper valve arrangements in series must be provided between the cylinder chambers. The two serially arranged damper valves must be arranged with respect to fluid flow in opposition to one another in order to provide for equal damping effects in both direction of piston movement.

Each steering damper arrangement acts with respect to a steering control movement of the vehicle steering system as a control resistance—although of relatively small value. As a result, a return force occurring during vehicle operation because of a given steering kinematic, which tends to move the steering to a straight-ahead position can be affected more or less detrimentally. Consequently, a compromise must be made in the design of a steering damper arrangement such that, on one hand, there is a sufficient damper effect and, on the other hand, the return tendency of the steering mechanism during vehicle operation is not excessively affected.

It is the object of the present invention to provide an essentially improved design, which is capable of especially effectively dampening strong shocks acting on the steering mechanism.

SUMMARY OF THE INVENTION

In a damper valve for use in a steering damper arrangement of a motor vehicle having a hydrostatic displacement motor for operating the vehicle steering mechanism wherein hydraulic fluid lines extending between the hydraulic motor and a servo-valve include the damper valve, the damper valve has a throttling arrangement which permits fluid flow in one direction and limits fluid flow in the opposite direction but permits essentially unlimited fluid flow in both directions as long as the pressure difference across the damper valve is below a predetermined threshold value so as to permit unrestricted normal steering movements of the vehicle steering system, but dampen shock movements thereof.

The invention is based on the concept to keep a bypass for the bridging throttling structure open or only slightly throttled as long as only a relatively small flow exists in the damper valve, that is, there is only a small pressure difference. If the flow or, respectively, the pressure difference increases in one direction the check valve closes and the throttle arrangement becomes effective as a damper. With flows or respectively, pressure differences in the opposite direction, the check valve always remains open.

If the damper valve according to the invention is used as a steering damper shock forces effective on the steering mechanism are effectively dampened by the high throttle resistance of the throttling arrangement whereas slow steering movements, particularly the steering wheel return forces which are effective during vehicle operation because of particular steering kinematics are unaffected.

In accordance with a preferred embodiment of the invention, the damper valve includes a piston with opposite front faces, one of which is exposed to the pressure at one side of the damper valve and the other is exposed to the pressure at the other side of the damper valve. A spring is provided, which biases the piston in one direction. This piston is coupled with the closing member in the check valve in such a way that the spring biases the closing member to its open position.

Preferred embodiments of the invention will be described below on the basis of the accompanying drawings.

DESCRIPTION OF PREFERRED EMBODIMENTS

Figure 1:
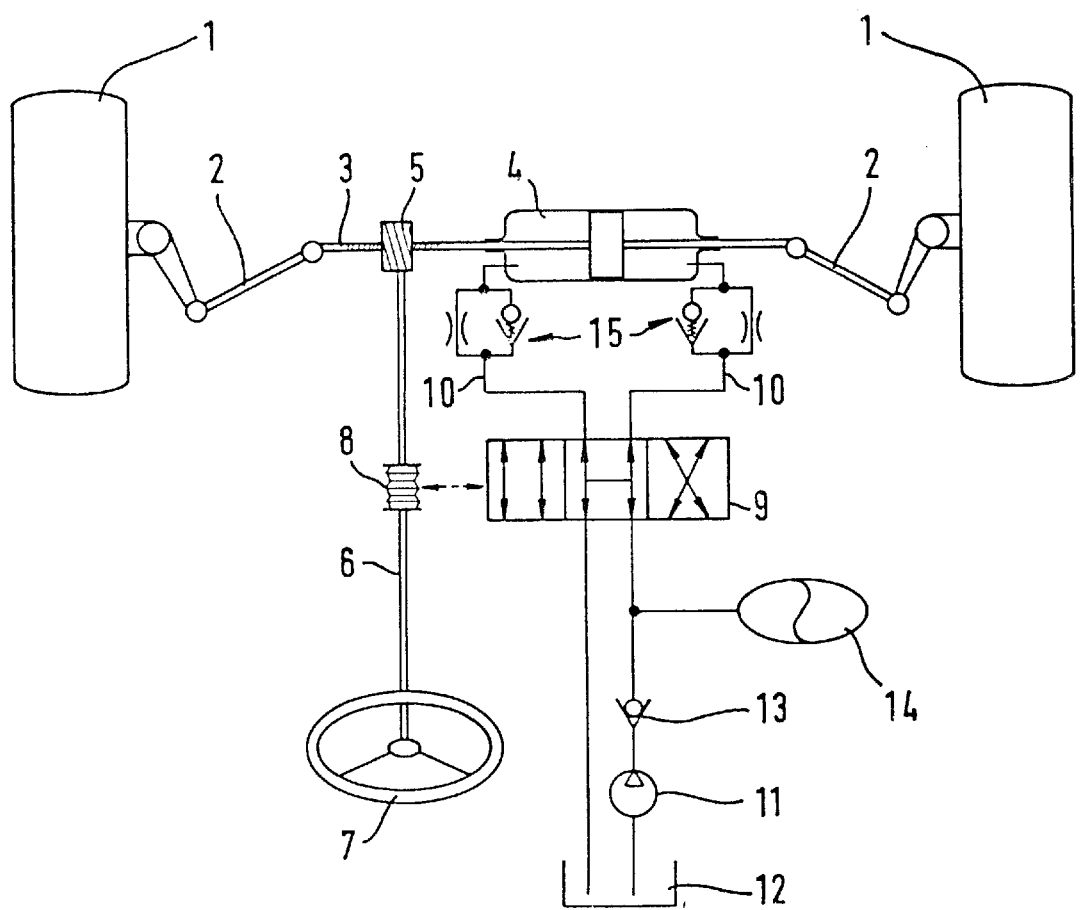
FIG. 1 shows schematically a hydraulic power steering with damper valves arranged between the servo-motor and the servo valve.

As shown in FIG. 1, a motor vehicle which is not shown in detail, includes steered front wheels 1 which, in the embodiment shown are connected, by way of tie rods 2, to the toothed rack 3 of a rack and pinion steering. The rack is connected to, or part of, a piston rod of a double-acting piston cylinder unit 4. The toothed rack 3 is in engagement with a pinion 5, which is drivingly connected, by way of a steering column 6, to a steering wheel 7. The steering column 6 includes a rotationally elastic element 8, so that limited relative rotation can occur between the pinion 5 and the steering wheel 7 dependent on the forces and torques transmitted between the pinion 5 and the steering wheel 7.

This relative rotation controls a servo-valve 9, which, on one side, is connected by motor lines 10 with the two chambers of the piston cylinders unit 4 and, on the other side, with the pressure side of a hydraulic pump 11 and with the relatively pressure free hydraulic reservoir 12 to which the suction side of the pump 11 is connected.

In the center position of the servo-valve 9 as shown in FIG. 1 the two chambers of the piston cylinder unit are in communication with one another and also with the reservoir 12. In addition, there may be a communication path open to the pressure side of the pump 11, so that the pump 11 can operate continuously.

Instead, it is also possible to close the valve connection with the pressure side of the pump 11 in the center position of the servo valve. In this case, the pump can then charge a pressure storage chamber 14 by way of a check valve 13 and can be controlled depending on the charge pressure, that is, the pump 11 can be switched off when the charge pressure exceeds a certain value.

As soon as forces, or rather, torques are effective between the pinion 5 and the steering wheel 7, the servo valve 9 is moved out of its center position in one or the opposite direction. As a result, a pressure difference is generated between the motor lines 10 in one or the opposite direction and consequently, a certain servo force is generated in the piston cylinder unit 4 in one or the opposite direction whereby the steering force required at the steering wheel to execute steering maneuvers is correspondingly reduced.

In accordance with the invention, the piston cylinder unit 4, which serves as the servo motor, is also used as a steering damper for damping shocks, which are effective on the steered vehicle wheels, and which would cause a change of the steering angle. To this end, the connections of the lines 10 between the servo valve 9 and the piston motor unit 4 include damper valves 15 of a design to be described below. Functionally, the damper valves 15 operate like a throttling valve provided with a check valve, which is arranged in parallel and is open toward the piston cylinder unit 4, but which assumes its closing position only if a pressure differential in excess of a threshold value is effective at the respective damper valve 15. As a result, shock-like movements of the piston of the piston cylinder unit 4 are effectively dampened. Slow movements of the piston as they occur for example when the steered vehicle wheels are automatically returned to their straight forward position during vehicle operation because of the steering kinematics, are practically unaffected.

Figure 2:
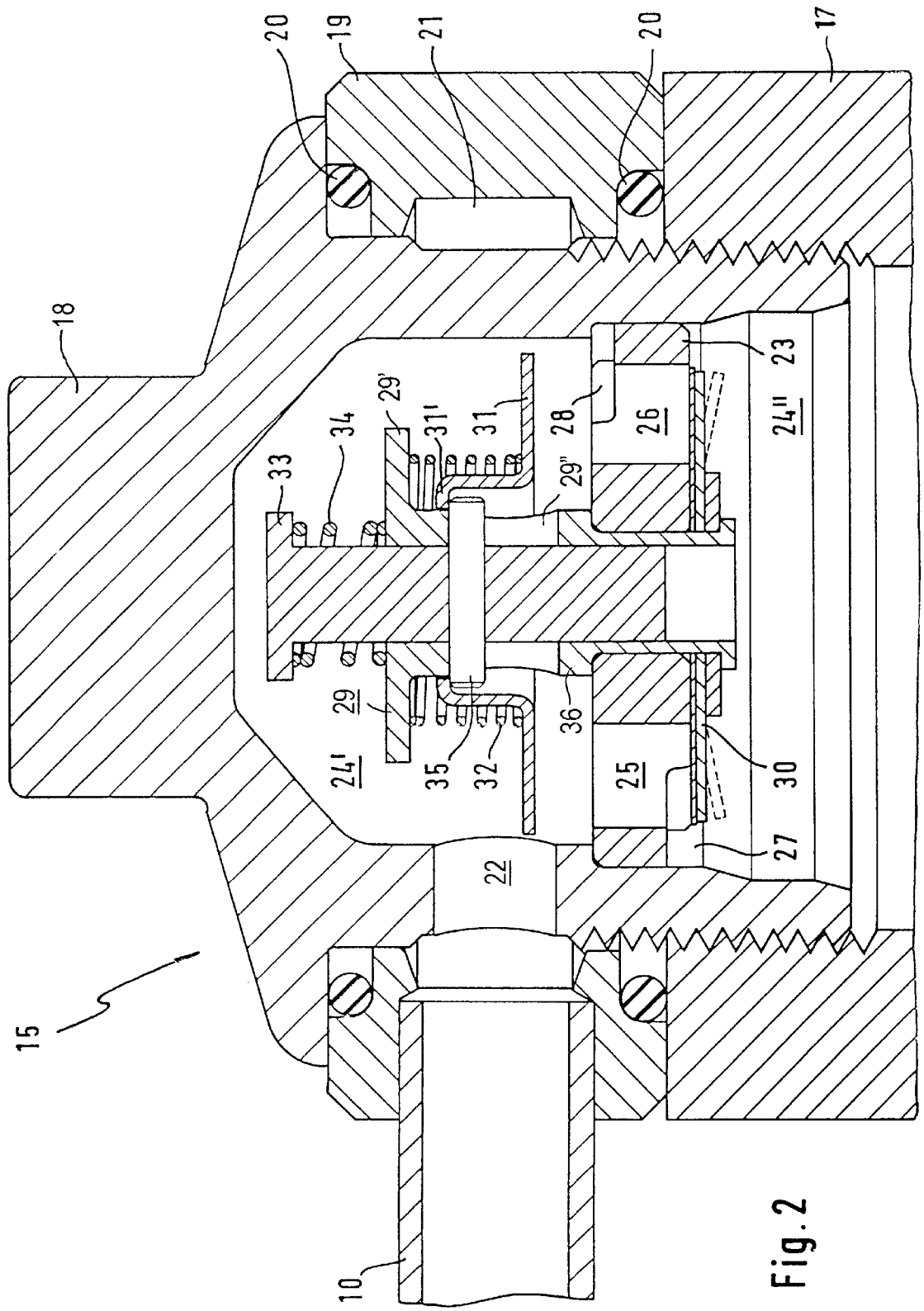
FIG. 2 is a cross-sectional view of a preferred embodiment of a damper valve, wherein the check valve structure is shown open.
Figure 3:
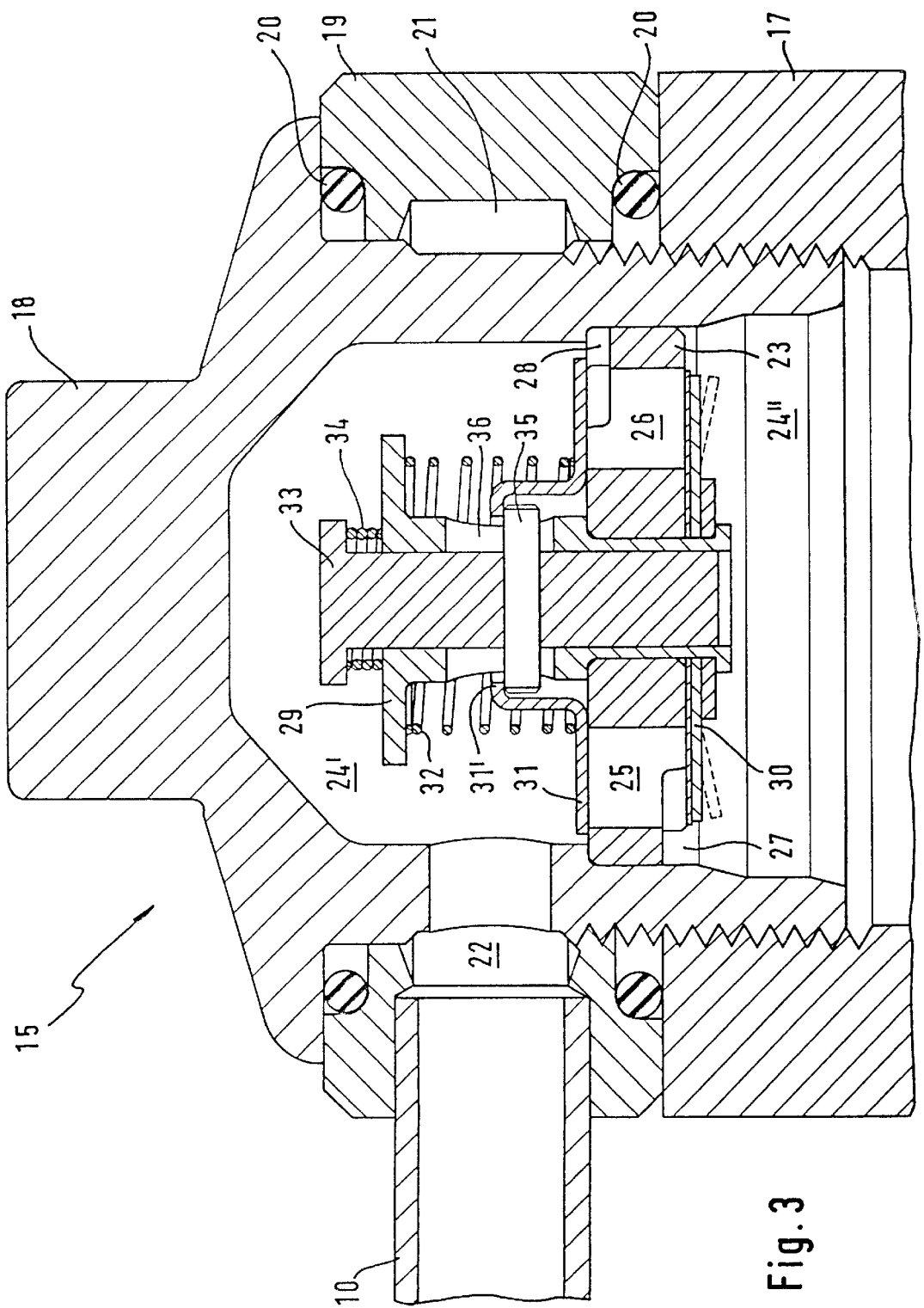
FIG. 3 is a cross-sectional view corresponding to that of FIG. 2 with the check valve structure closed.

FIGS. 2 and 3 show a particularly advantageous embodiment of the damper valve 15.

At the housing of the servo valve 9 (see FIG. 1) which is shown in FIGS. 2 and 3, there is provided for each of the lines 10 shown in FIG. 1 leading to the motor 4, a connection, which is arranged coaxially within an annular member 17 provided with an internal thread. A hat-like housing member 18 with an external thread is threaded into the member 17 wherein, between opposite flange surfaces of the internally threaded member 17 and the housing member 18, a support ring 19 is engaged which is firmly connected to the motor line 10. Seal rings 20 are disposed in the gaps between the front sides of the support ring 19 and the adjacent flange surfaces of the internally threaded member 17 and the housing member 18 so as to provide pressure seals.

The support ring 19 includes an internal annular groove 21 forming a passage, which is in communication with the motor line 10 and also with one or more radial bores 22 in the housing member 18 and which consequently places the motor line 10 in communication with the interior of the housing member 18.

Within the hat-like housing member 18, an annular disc-like carrier 23 provided with axial passages 25, 26 is firmly supported so as to divide the space within the housing member 18 into a space 24' disposed adjacent the radial bore or bores 22 and a space 24" disposed adjacent the open end of the housing member 18.

The axial passage 25 of the disc-like carrier 23 is provided with a recess 27 disposed adjacent the space 24" at the lower front face of the disc-like carrier 23 and the axial passage 26 has a similar recess 28 at the upper front face of the disc-like carrier 23.

The disc-like carrier 23 has a central opening in which a hollow cylindrical bolt 33 is supported. At its lower end, the bolt 23 supports an annular disc-like plate 30 so as to be disposed adjacent the carrier 33. At the opposite side of the carrier 23, the bolt 29 has an axial guide structure for an annular disc 31.

The spring plates 30 disposed on the disc like carrier 23 are so dimensioned that they cover, at least to a large extent, the axial passages 25, 26 of the disc-like carrier 23, whereby however, the areas of the axial bores 25 with the recesses 27 remain free. The annular disc 31 is so dimensioned that it can fully cover the axial bores 25, whereby, however, the areas of the recesses 28 of the axial bores 26 remain free.

The annular disc 31 has at its inner end a sleeve-like axial extension with an end flange 31' which is angled toward the cylindrical bolt 29 and surrounds the bolt 29 with small radial play. Between the annular disc 31 and a flange 29' formed at the upper end of the bolt 29, a compression spring 32 is disposed which biases the annular disc 31 onto the disc-like carrier 23 as shown in FIG. 3.

The hollow cylindrical bolt 29 defines an axially extending passage in which a plunger-like piston 33 is axially movably disposed and sealingly closes the passage of the bolt 29. At its upper end as shown in FIGS. 2 and 3, the piston 33 has a radially projecting annular flange, which forms a support structure for one end of a compression spring 34, which, with its other end, engages the adjacent end face of the hollow bolt 29. The piston 33 carries a transverse pin 35, which extends through radial openings 36 in the bolt 29. The radial openings 36 are elongated in axial direction of the bolt 29. The free opposite ends of the transverse pin 35 are disposed below the end flange 31' of the annular disc 31 so that the annular disc 31 is lifted off the disc-like carrier 23 when the piston 33 moves upwardly into its upper position as shown in FIG. 2. The radial openings 36 extend sufficiently far downwardly that the annular disc 31 can assume a position in which it is seated on the disc-like carrier 23 as shown in FIG. 3 before the pin 35 is seated on the lower end walls of the radial openings 36.

The compression spring 34 has a greater spring tension than the compression spring 32, so that the components are positioned as shown in FIG. 2, if no external forces are effective. In this position, the compression spring 34 holds the piston 33 in its upper end position as given by the transverse pin 35 and the upper end walls of the radial openings 36 wherein the annular disc 31 is lifted off the disc-like carrier 23.

As soon as there is a pressure at the front side of the piston 33 providing for a sufficient pressure differential to become effective on the piston 33, the piston 33 is moved downwardly whereby the compression spring 32 biases the annular disc 31 into engagement with the adjacent front surface of the disc-like carrier 23.

The damper valve described herein operates as follows:

The annular disc 31 remains in the position as shown in FIG. 2, that is remote from the carrier 23, as long as the pressure in the space 24" is greater, the same or only slightly less than the pressure in the space 24'. This means that fluid can generally flow through the axial passages 25 from space 24" to space 24'. Such a flow is generally unthrottled or subjected only to little throttling.

In addition, a smaller flow is unthrottled or almost unthrottled in the opposite direction as long as the pressure differential generated by such a fluid flow in the spaces 24' and 24" remains sufficiently small so that the piston 33 can be held by the compression spring 34 in the position as shown in FIG. 2.

As a result, the piston of the piston cylinder unit 4 of FIG. 1 is practically not dampened hydraulically by the damper valves 15 as long as it moves relatively slowly. The fluid flow through the damper valves resulting from the slow movement of the piston cylinder unit 4 are not sufficient to generate, in either of the damper valves 15, a pressure differential between the spaces 24' and 24" which is sufficient to move the piston 33 downwardly.

As a result, the steering kinematics-induced return forces of the steering mechanism, which are effective during vehicle operation are not inhibited by the damper valves 15.

As soon as disruptive forces are effective on the steered vehicle wheels, which result in shock-like movements of the piston of the piston cylinder unit 4, hydraulic fluid is suddenly supplied, by way of the motor lines 10, to the servo valve 9 with the result that in the space 24' of the damper valve 15 associated with this motor line a noticeable excess pressure over the pressure in the space 24" is generated. As a result, the piston 33 is pushed into the hollow bolt 29 (downwardly in FIG. 2) and the annular disc 31 is pressed by the compression spring 32 against the disc-like carrier 23. Then the axial bores 25, which cooperate with the annular disc 31, like in a check valve, closed by the annular disc 31 and the hydraulic fluid can flow from the space 24' to the space 24' only by way of the axial passage 26. During such flow the hydraulic fluid is throttled whereby the movement of the piston in the piston-cylinder unit 4 it dampened.

In accordance with a preferred embodiment, the compression spring 32 may consist of a memory alloy with temperature-dependent properties, whereby the compression spring 32 exerts normal compression forces above a certain threshold temperature value and below the threshold temperature value exerts only a small spring force. Then the compression spring 32 can generate only a small force when the temperature is below such threshold value, whereby the annular disc 31 can be moved downwardly by the force of the spring 34. This means that the piston 33 can be moved downwardly against the force of the spring 34 only when there is a larger pressure difference between the spaces 24' and 24".

In this way, temperature dependent viscosity changes of the hydraulic fluid can be at least partially compensated.

At very low temperatures, that is, below the threshold temperature of the spring 32, the liquid becomes increasingly less viscous. With the same volume flow from space 24' to the space 24" through the axial passages 25, there is then an increased pressure difference between the spaces 24' and 24". With the spring 32 consisting of a memory alloy, it is consequently possible that, at low temperatures a similarly large volume flow from space 24' to space 24" can exist for moving the piston 33 downwardly as it exists at higher temperatures.

Figure 4:
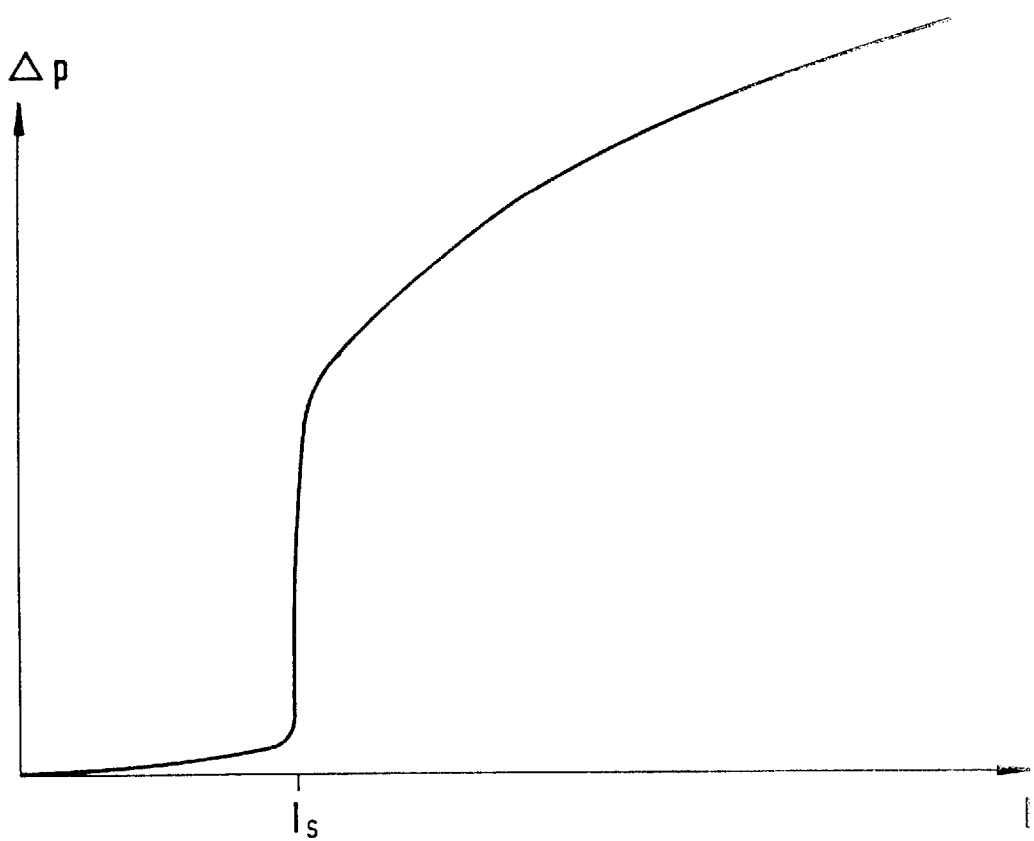
FIG. 4 is a diagram showing the operating characteristic of the damper valve according to the invention, wherein the pressure differential effective on the damper valve in the flow direction in which the check valve is closed is shown dependent on the volume flow through the damper valve.

FIG. 4 shows the behavior of the damper valve according to the invention. In the diagram shown, the volume flow of the hydraulic fluid from space 24' to space 24" is indicated on the base.

The ordinate shows the respective pressure difference $\Delta p$ between the space 24' and the space 24". Below a threshold value $I_s$ of the volume flow, only a small pressure difference $\Delta p$ can occur since the annular disc 31 is in the position remote from the disc-like carrier 23. In the vicinity of the threshold value $I_s$ of the volume flow a sufficient pressure differential $\Delta p$ is achieved by which the piston 33 can he pushed down in order to move the annular disc 31 into engagement with the disc-like carrier 23. In this way, the passages 25 are closed with the result that, with a further increase of the volume flow, the fluid can flow only through the axial passages 26. In this case, the spring plates 30 provide a highly increased throttling resistance to the fluid flow. Accordingly, the pressure differential increases steeply when the threshold value is exceeded.

What is claimed is:

1. A damper valve for a hydraulic power steering of a motor vehicle, said damper valve including a throttling arrangement permitting fluid flow in at least one direction, a check valve arrangement disposed in parallel flow relationship with said throttling arrangement, and including a disc-like carrier member with first axial passages which can be controlled by a spring loaded annular disc disposed on a front side of said carrier member and second axial passages, which are controllable by a spring plate disposed on the opposite side of said carrier member and a control member supported on said disc-like carrier member so as to be movable in opposite directions and having one end exposed to the fluid pressure at one side of the damper valve and its opposite side exposed to the fluid pressure at the opposite side of said damper valve said control member being spring loaded so as to bias said control member in a direction against the pressure difference in said damper valve and engaging said spring-loaded annular disc, said check valve arrangement being open for a flow in a direction opposite to the flow through said throttling arrangement and, when open, having little or no flow resistance, said spring loaded annular disc being normally held in an open position, but being closed when a predetermined pressure difference $\Delta p$ exceeding a certain threshold is effective across the check valve arrangement in one direction, that is, when a flow through the open check valve arrangement in said one direction exceeds a predetermined threshold value.

2. A damper valve according to claim 1, wherein said control member has the form of a piston.

3. A damper valve according to claim 1, wherein spring means are provided for holding the check valve structure open, said spring means being temperature dependent such that the force of said spring means increases with decreasing temperature.

4. A damper valve according to claim 3, wherein said check valve structure is held open by a temperature independent spring and said annular disc is engaged so as to be biased in closing direction by a spring having a temperature dependent spring force which decreases when the temperature falls below a predetermined threshold value.

* * * * *